Figure 1:
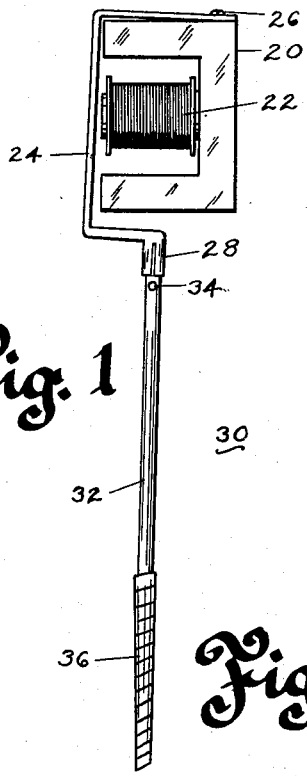

July 21, 1953 — E. M. POIROT — 2,646,261
DEVICE WHICH AERATES WATER
Filed June 23, 1950

INVENTOR
Eugene M. Poirot
BY
ATTORNEY

Patented July 21, 1953

2,646,261

UNITED STATES PATENT OFFICE 2,646,261

DEVICE WHICH AERATES WATER

Eugene M. Poirot, Golden City, Mo.

Application June 23, 1950, Serial No. 169,857

5 Claims. (Cl. 259—128)

This invention relates to improvements in devices which aerate water. More particularly, this invention relates to improvements in devices which can, when vibrated rapidly, aerate the water with which they are in contact.

It is therefore an object of the present invention to provide an improved device which can, when vibrated rapidly, aerate the water with which it is in contact.

In the aeration of water, two factors are of great importance: first, the cost of the aerating equipment, and second the efficiency of that equipment. Of the many different devices that have been proposed for aerating water, most are either unduly expensive or insufficiently efficient. The device provided by the present invention is quite inexpensive to manufacture, and yet it operates quite efficiently. That device includes a source of low amplitude, medium frequency oscillations, and an agitator which is acted upon by said source and caused to oscillate. The agitator will, when partially immersed in water, cause rapid and efficient aeration of the water. It is therefore an object of the present invention to provide a source of low amplitude, medium frequency oscillations, and an agitator which is acted upon by said source and caused to oscillate in water.

The amplitude of oscillation of the agitator provided by the present invention is small enough and the frequency of oscillation of that agitator is large enough that fish can swim near that agitator without risking injury. This is a considerable advantage because it enables the agitator to be used to aerate water for fish without any need of a protective screen or casing. The need of such a screen or housing, and the problem of mounting that housing in fixed relation to a rotating impeller, unduly increased the cost of many prior water-aerating devices. It is therefore an object of the present invention to provide an agitator which can aerate water without injuring the fish in that water, and which does not require a guard.

Many prior water-aerating devices rely upon motor-driven impellers to force air down into the water or force water up into the air. However, the cost of the motors needed to drive the impellers is high, and thus the overall cost of the water-aerating devices is high. The present invention avoids this high cost by substituting a vibrator for the motor; the vibrator being much less expensive.

When water is forced into air the water tends to form drops, and those drops have large volume-to-surface ratios. Similarly when air is forced into water the air tends to form bubbles, and those bubbles have large volume-to-surface ratios. Any aeration due to the passage of such drops through the air and the passage of such bubbles through the water will necessarily be limited because of the small area of contact between the air and water. It would be possible to increase the amount of aeration that can be attained, by passing water through air or air through water, by subdividing the drops of water into droplets and by subdividing the bubbles of air into colloidal-size particles; and the agitator provided by the present invention does this. It is therefore an object of the present invention to provide an agitator which can subdivide water into droplets and speed those droplets through the air, and which can subdivide air into colloidal-size particles and force them into the water.

Other and further objects and advantages of the present invention should become apparent from an examination of the drawing and accompanying description.

In the drawing and accompanying description several preferred embodiments of the present invention are shown and described but it is to be understood that the drawing and accompanying description are for the purpose of illustration only and do not limit the invention and that the invention will be defined by the appended claims.

In the drawing Fig. 1 is a diagrammatic view of a source of low amplitude, medium frequency oscillations, and an agitator which is acted upon by said source to vibrate.

Figure 2:
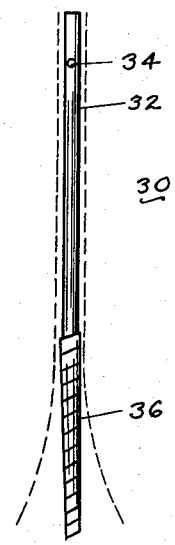

Fig. 2 is a front elevational view of the agitator of Fig. 1 and it indicates by dotted lines the limits of the path of oscillation experienced by such agitator.

Figure 3:
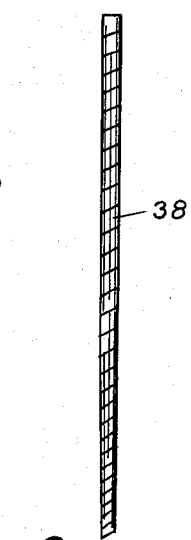
Figure 4:
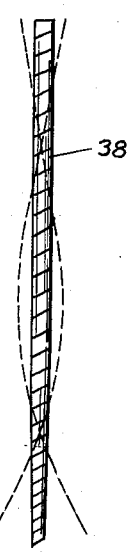
Figure 5:
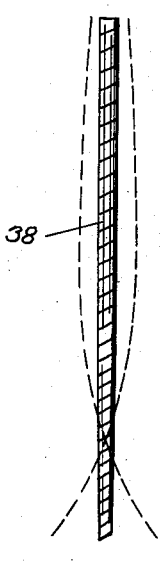
Figure 6:
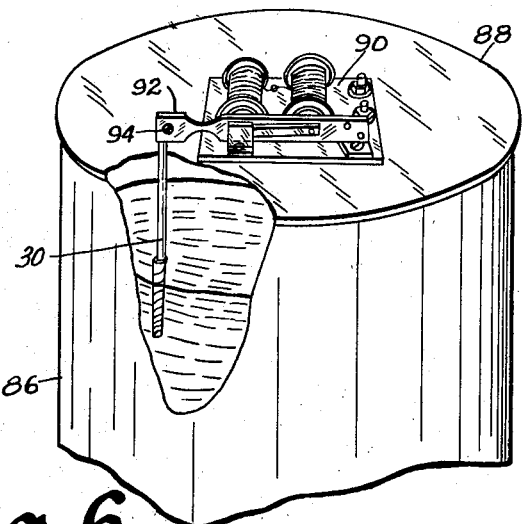

Fig. 3 is a front elevational view of an agitator which is formed by winding a strip of metal in helical fashion along a mandrel, Fig. 4 is a front elevational view of the agitator of Fig. 3, and it indicates in dotted lines the limits of oscillation of that agitator when that agitator is held at a slight distance below its upper end, Fig. 5 is a front elevational view of the agitator shown in Figs. 3 and 4 and it indicates by dotted lines the limits of oscillation experienced by that agitator when held at its upper end, and Fig. 6 is a perspective view of a minnow bucket which has a source of oscillations atop it and which has an agitator supported by that source Referring to the drawing in detail, the numeral 20 denotes an E-shaped electromagnetic core 20 which has a winding 22 formed on the center leg thereof; and that winding can respond to alternating current to create an alternating magnetic field in the core 20. An armature 24, of magnetic material, is riveted or otherwise secured to the core 20 by a rivet 26 or any other suitable fastening. The upper end of the armature 24 will be somewhat resilient so the lower end of the armature can be pulled toward or permitted to spring away from the core 20. In the absence of an alternating current in the core winding 22, the lower end of the armature 24 will respond to the resiliency of the metal within it to move away from the end face of the core 20. When an alternating current is passed through the core winding 22, the armature 24 will be alternately drawn toward and urged away from the end face of the core 20. Where the current alternates at a frequency of sixty (60) cycles per second, the armature 24 will be caused to oscillate at a medium range of frequency. The lower end of the armature 24 has a spring collet 28 formed therein and that collet interchangeably receives agitators which can be acted upon by the oscillating armature 24.

One agitator which can be held by the spring collet 28 and which can be caused to oscillate by movement of the armature 24 is denoted by the numeral 30. That agitator includes a hollow tube 32 which has an opening 34 thereof below the upper end thereof. The upper end of the agitator 30 will extend within and be tightly held by the spring collet 28 on the lower end of armature 24. When the upper end of agitator 30 is disposed within spring collet 28, the opening 34 will be disposed a short distance below the bottom of that spring collet. A wound extension 36 is intimately secured to the lower end of the tube 32 and it projects well below the lower end of that tube. The wound projection 36 is made by winding a strip of metal around a mandrel and then slipping the end of that wound section over the lower end of the tube 32. The tube 32 will be relatively stiff, while the wound portion 36 will be quite flexible. As the armature 24 oscillates rapidly, the tube 32 will be caused to move between the limits of oscillation indicated by dotted lines in Fig. 2. The wound portion 36 of agitator 30 will whip between the limits of oscillation indicated by the curved dotted lines at the bottom of Fig. 2.

When this movement of agitator 30 occurs while the opening 34 is above water and the wound portion 36 is below water, the whipping action of the wound portion 36 causes air to be drawn into the opening 34 and to pass down through the tube 32 and be expelled from the bottom of the wound portion 36. Where the amplitude of oscillation of the wound section 36 is large, as indicated by the dotted lines in Fig. 2, openings will be formed between adjacent turns of the wound portion 36 and air can also be discharged through those openings. The rapidity with which the wound portion 36 whips back and forth is such, and the openings which form between adjacent turns of the wound portion 36 are so small, that the air passing out of the lower end of the wound section 36 or through the spaces between adjacent turns is broken up into particles of colloidal-size. These particles of air have large surface-to-volume ratios and are readily acted upon by the water which surrounds them. In many instances the air particles are quickly absorbed by the water and in most instances those particles will remain in the water and not rise to the top. This effects a very substantial aeration of the water.

If the oscillations of the agitator 30 occur while part of the wound section 36 is above the water and the rest of the wound section 36 is below the water, water tends to work its way up into the wound section 36 and to be expelled from the openings formed between adjacent turns of that wound section as that wound section bends during its oscillation. The openings formed between adjacent turns of the wound section are so small and they close so quickly that the water issuing from those openings is broken up into small droplets. These droplets are cast from the agitator 30 with considerable force and they travel through the air with considerable speed. In their travels through the air, these droplets will be able to absorb considerable quantities of air because of the large surface-to-volume ratios of these droplets. Upon falling back to the surface of the water, they will carry that absorbed air and act to aerate the water.

The cost of the source of oscillation and the agitator 30 is quite small and there is little or no upkeep in connection with it. There are no points which can burn or erode and there are no precise adjustments to require constant attention. In addition, the agitator obviates all need for an enclosing housing, it eliminates all need of rapidly rotating shafts with widely spaced bearings that must be kept carefully aligned, and it obviates problems in connection with rotary seals on rapidly moving shafts. The desired effect of forcing colloidal-size particles of air into water or forcing droplets of water into the air is controlled by setting the agitator 30 at the required position relative to the level of the water. The agitator 30 has an additional action, in that it tends to create and maintain voids in the water adjacent the ends of its path of oscillation. Water and air will naturally tend to enter those voids; and the agitator will subdivide that water into droplets and will subdivide that air into colloidal-size particles. Such subdivision of air and water enhances aeration.

Another form of agitator provided by the present invention is shown in Figs. 3–5, and that agitator is denoted by the numeral 38. The agitator 38 is formed by winding a narrow strip of metal in helical fashion on a mandrel, and then removing the mandrel. The strip of metal becomes narrower as it approaches the lower end of the agitator 38, and thus the number of turns per unit of length is greater at the bottom of agitator 38 than it is at the center or top of that agitator. This makes the lower end of the agitator 38 more flexible than the center and top portions of that agitator. However, all portions of the agitator 38 can flex.

Where the agitator 38 is held by a spring collet such as the spring collet of Fig. 1, the agitator will experience the oscillation indicated by the dotted lines in Fig. 5. The major portion of the length of the agitator 38 will define the greater portion of an elongated loop, while the lower end of the agitator 38 will defined a node and will also define the beginning of a loop of considerable amplitude. Where the agitator 38 is held a short distance below its upper end, as by a screw clamp such as the screw clamp 94 in Fig. 15, the agitator can form the beginning of a loop of relatively small amplitude above the node which will exist where the screw clamp engages the agitator. In addition, the agitator 38 will experience a complete loop below its point of attachment to the screw clamp, it will experience a node at the end of the loop, and will experience the beginning of a second loop. The particular configuration of oscillation desired can be controlled by selecting the point where the agitator 38 is to be secured to the source of oscillation.

As the agitator 38 oscillates, the turns of the agitator will tend to move toward and away from each other. Those turns which are above the level of the water can admit air into the interior of the agitator 38 and can permit egress of water from that interior, while the turns which are below the level of the water can move apart to permit ingress of water into the interior of agitator 38 or permit egress of air or water from that interior. Where the agitator is caused to oscillate as indicated in Fig. 4 and the agitator 38 is set so the lower node is at the water level, air will enter the spaces between the turns forming the loop above the node and will then be drawn down through the center of agitator 38 and expelled from the open end of that agitator. In addition, some air will also issue from the turns between the open lower end of agitator 38 and the lower node. Simultaneously, some water will find its way along the turns of the agitator 38 and be expelled from the space between those turns as the turns move toward and away from each other. These tiny particles of water will be in the form of droplets and will have large surface-to-volume ratios. The action of agitator 38 in expelling water is particularly pronounced when the agitator operates as indicated in Fig. 4 and when the agitator is submerged to its midpoint. That midpoint will be describing the loop indicated by dotted lines and will cause large numbers of tiny droplets to be forced into the air. At such time, only a very little amount of air will be drawn down through the agitator and expelled from the bottom thereof.

When agitator 38 oscillates as indicated in Fig. 5 and when the node is set at the water line, the principal effort of the agitator 38 will be in forcing colloidal-size particles of air from the open lower ends of agitator 38 into the water. Some spraying of water will occur adjacent the water line but that will be rather secondary in character. However, when that agitator is set so the mid-portion of the loop defined by the middle and upper portions of agitator 38 is at the water line, a considerable quantity of small droplets are cast about in the air.

The agitator shown in Figs. 3-5 has a secondary action in aerating water. The rapid oscillation of the loop portions of the agitator 38 causes a void to exist adjacent each end of the limits of travel of the agitator 38. The agitator 38 has such a rapid frequency of oscillation that the water cannot readily fill those voids and as a result air is permitted to enter those voids. As the agitator moves back and forth between its limits of oscillation, it will force the air into the water, thus effecting additional aeration of the water. The action of the agitator 38 is so rapid that small colloidal-size particles of air are forced into the water and the water is beaten into droplets. As the result, the intermingling air and water has large surface-to-volume ratios and aeration occurs rapidly and efficiently.

When agitator 38 is made of thin metal, as for example a one sixty-fourth ($\frac{1}{64}$) inch thick strip of phosphor bronze, the lower end of that agitator will define a cone. The circular component of the motion of the lower end of agitator 38 will cause a gentle circulation of the water surrounding agitator 38. This circulation enhances aeration of the water.

In Fig. 6 the numeral 86 generally denotes a minnow bucket. This bucket has a cover 88 therefor and a source of oscillatory movement, which is denoted by the numeral 90 as disposed atop the cover 88. The source of oscillatory movement is quite similar to the buzzers for door bells. It has two connected electromagnets and a set of breaker points which interrupts the circuit as the armature 92 is drawn toward the electromagnets. A spring drives the armature back into engagement with the contact points when the interruption of the circuit permits the electromagnets to release the armatures. The armature 92 has a screw clamp 94 thereon and that screw clamp can releasably support agitators. The agitator 38 is shown in Fig. 6 and it will extend through an opening, not shown, in the cover 88. The source of oscillatory movement which is denoted by the number 90 is of such small size that it can be operated by the storage battery of an automotive vehicle. This is desirable where the user wishes to take the minnow bucket with him in such a vehicle.

The various agitators shown in the drawing will be oscillated at such speed and for such amplitude of oscillation that they will not injure fish in the water in which the agitators are operated. This is very desirable because it eliminates all need of a housing for the agitators. In addition, the use of the simple sources of oscillatory movement obviates all need for rotary shafts, precisely aligned seals and bearings for such shafts, and the cost of rotatable motors. Moreover, the agitators provided by the present invention cause greater aeration of the water because they subdivide the air and water into smaller particles than is possible with rotary aerating devices.

The turns of those agitators which are wound in helical form, should be closely adjacent each other. Those turns will enable the agitator to conduct air down into the water while permitting limited ingress and egress of water and air into and out of the agitator. The material of which the agitators are made should be resilient and tough, but many metals and non-metals can meet this requirement. The agitators should be slender so they can oscillate without undue power consumption or undue agitation of the water; the agitator 38 of Figs. 3-5 having an inside diameter of three thirty-second ($\frac{3}{32}$) of an inch and having an outside diameter of one-eighth ($\frac{1}{8}$) of an inch.

Whereas a number of embodiments are shown and described in the drawing and accompanying description it should be obvious to those skilled in the art that various changes may be made in the form of the invention without affecting the scope thereof.

What I claim is:

1. An agitator that can respond to oscillations to cause aeration of liquids and that comprises a strip of metal that is wound in helical fashion to form a hollow tube, said strip being narrower adjacent the lower end of said tube than it is adjacent the upper end of said tube, whereby said lower end of said tube is more flexible than the upper end of said tube, all of said tube being flexible.

2. An agitator that can respond to oscillations to cause aeration of liquids and that comprises a strip that is wound in helical fashion to form a hollow tube, said tube being flexible, the adjacent turns of said strip being movable toward and away from each other as said tube oscillates to permit passage of liquid through the walls of said tube.

3. An agitator that can respond to oscillations to cause aeration of liquids and that comprises an elongated tube that has a readily flexible lower end, said readily flexible lower end of said tube responding to oscillation of said tube to move through an arc and draw air down through said tube, the major portion of said tube being a smooth-walled pipe and the lower end of said pipe being a strip wound to form a pipe.

4. An aerating device for liquids that comprises a source of oscillations and an agitator that can be acted upon by said source and caused to oscillate, said agitator being elongated, thin, flexible, and narrow and flexing during said oscillations, a portion of said agitator flexing sufficiently to have an amplitude of oscillation greater than the amplitude of oscillation imparted to said agitator by said source, said portion of said agitator being flexible throughout its entire length and having sufficient kinetic energy to force air and liquid that are in contact with each other to intermingle intimately, whereby aeration of said liquid results, said agitator being a tube and said portion of said agitator being the lower end of said tube.

5. An aerating device for liquids that comprises a source of oscillations and an agitator that can be acted upon by said source and caused to oscillate, said agitator being an elongated tube that extends downwardly into the liquid, an opening in said tube above the level of the liquid and an opening in said tube below the level of the liquid, said source of oscillations moving said agitator through a short path of reciprocation in said liquid to displace liquid and draw air into the first said opening, down through said tube and out of the second said opening, said agitator having sufficient kinetic energy to force air and liquid adjacent the second said opening to intermingle intimately.

EUGENE M. POIROT.

References Cited in the file of this patent

UNITED STATES PATENTS

| Number | Name | Date |
|---|---|---|
| 453,998 | Foster | June 9, 1891 |
| 490,508 | Shaw | Jan. 24, 1893 |
| 671,516 | Hegner | Apr. 9, 1901 |
| 862,856 | Tygard | Aug. 6, 1907 |
| 1,208,862 | Velessarides | Dec. 19, 1916 |
| 1,704,026 | Wahl | Mar. 5, 1929 |
| 1,705,162 | Wahl | Mar. 12, 1929 |
| 1,716,960 | Hirschy | June 11, 1929 |
| 2,092,353 | Kyseth et al. | Sept. 7, 1937 |
| 2,505,423 | Morgan | Apr. 25, 1950 |